United States Patent
Wurm et al.

(10) Patent No.: US 11,581,526 B2
(45) Date of Patent: Feb. 14, 2023

(54) METHOD FOR PRODUCING POROUS ELECTRODES FOR ELECTROCHEMICAL CELLS

(71) Applicant: Robert Bosch GmbH, Stuttgart (DE)

(72) Inventors: Calin Iulius Wurm, Meitingen (DE); Harald Bauer, Ehningen (DE); Leonore Glanz, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 17/056,027

(22) PCT Filed: May 15, 2019

(86) PCT No.: PCT/EP2019/062413
§ 371 (c)(1),
(2) Date: Nov. 17, 2020

(87) PCT Pub. No.: WO2019/219719
PCT Pub. Date: Nov. 21, 2019

(65) Prior Publication Data
US 2021/0249647 A1    Aug. 12, 2021

(30) Foreign Application Priority Data

May 17, 2018 (DE) ..................... 10 2018 207 773.8

(51) Int. Cl.
*H01M 4/139*     (2010.01)
*H01M 4/04*      (2006.01)
(Continued)

(52) U.S. Cl.
CPC ........... *H01M 4/139* (2013.01); *H01M 4/043* (2013.01); *H01M 4/0404* (2013.01);
(Continued)

(58) Field of Classification Search
CPC .................................................. H01M 4/0404
See application file for complete search history.

(56) References Cited

U.S. PATENT DOCUMENTS 3,802,878 A * 4/1974 Lindstrom .......... H01M 4/8875
419/26
4,396,693 A * 8/1983 Bernstein ................ H01M 4/04
252/182.1
(Continued)

FOREIGN PATENT DOCUMENTS

DE    102016217386    3/2018
JP    2005158401      6/2005
WO    2017053962 A1   3/2017

OTHER PUBLICATIONS

International Search Report for Application No. PCT/EP2019/052203 dated Apr. 18, 2019 (English Translation, 2 pages).

*Primary Examiner* — Austin Murata
(74) *Attorney, Agent, or Firm* — Michael Best & Friedrich LLP

(57) ABSTRACT

The invention relates to a method for producing an electrochemical cell comprising at least one porous electrode (2'), the method comprising at least the following method steps: (a) providing an electrode composition in the form of a homogeneous mixture comprising (i) at least one particulate active material (3); (ii) at least one particulate binder (5); (iii) at least one particulate pore-forming agent (4); and (iv) optionally at least one conducting additive (6); (b) forming a mouldable mass from the electrode composition; (c) applying the electrode composition to at least one surface of a substrate (1) to obtain a compact electrode (2); (d) producing an electrochemical cell comprising at least one compact electrode (2) which comprises the electrode composition according to method step (a); and (e) heating the at least one compact electrode (2) to liquefy the at least one (Continued)

particulate pore-forming agent (4); and/or (f) bringing the compact electrode (2) into contact with at least one liquid electrolyte composition or at least one liquid constituent of an electrolyte composition for an electrochemical cell which is capable of at least partially dissolving the at least one particulate pore-forming agent (4) to obtain a porous electrode (2), wherein method steps (a), (b), (c), (d) and (e) are carried out substantially without solvents.

14 Claims, 1 Drawing Sheet

(51) Int. Cl.
*H01M 4/62* (2006.01)
*H01M 10/0525* (2010.01)
*H01M 4/02* (2006.01)

(52) U.S. Cl.
CPC ........... *H01M 4/0471* (2013.01); *H01M 4/62* (2013.01); *H01M 10/0525* (2013.01); *H01M 2004/021* (2013.01); *H01M 2220/20* (2013.01)

(56) References Cited

U.S. PATENT DOCUMENTS

| | | |
|---|---|---|
| 2008/0226984 A1 | 9/2008 | Lee et al. |
| 2010/0015327 A1* | 1/2010 | Rieke ................. H01M 4/0416 252/182.1 |
| 2011/0114254 A1* | 5/2011 | Xu ....................... H01M 4/139 264/41 |
| 2015/0061176 A1 | 3/2015 | Bruckner et al. |
| 2015/0303481 A1 | 10/2015 | Duong et al. |
| 2015/0357626 A1 | 12/2015 | Holman et al. |

\* cited by examiner

METHOD FOR PRODUCING POROUS ELECTRODES FOR ELECTROCHEMICAL CELLS

BACKGROUND OF THE INVENTION

The invention relates to a process for producing a porous electrode for an electrode. The invention also relates to an electrode and the use of an electrode in an electrochemical cell.

Electrodes for electrochemical cells, for example electrodes for lithium-containing battery cells or electrodes for fuel cells, generally comprise at least one particulate material (e.g. particulate active materials and/or conductive additives) which is bonded by means of at least one binder to give an agglomerated electrode composition. A very homogeneous distribution of all constituents of the electrode composition, i.e. both all particulate materials and all binders, is critical for the quality of the electrodes. Two fundamentally different processes have been described for this purpose in the prior art. The electrodes obtained by means of these processes differ first and foremost in terms of their porosity. A high porosity is advantageous in the electrode to bring about rapid diffusion of the charge carriers (e.g. lithium ions).

In the slurry process, an active material slip in which the particulate materials are dispersed in a solution composed of a polymeric binder and a suitable solvent is produced. The slip is subsequently applied to a current collector in a coating process. The solvent is then removed by drying so as to give a porous layer of the particulate materials and the binder on the surface of the current collector.

US 2015/0357626 A1 and US 2010/0015327 A1 describe processes of this type in which a pore former is additionally added to the active material slip and is dissolved out of the electrode in a later step. The porosity of the electrode is increased further in this way. As preferred pore former, mention is made of ethylene carbonate.

As an alternative, a process for the solvent-free production of an electrode composition which can be applied to the surface of a current collector or be processed to form free-standing electrode sheets has been described in, for example, US 2015/303481. In this process, an electrode composition is provided in the form of a shapeable composition comprising at least one electrode active material and at least one polymeric binder and optionally at least one conductive additive. Fibrils are formed from the binder particles by introduction of shear forces (e.g. by use of mechanical mills such as jet mills or ball mills), and these fibrils bring about agglomeration of the electrode composition. The shapeable composition can, for example, be shaped by means of an extruder and/or calender to give a stable, free-standing electrode sheet and applied to a current collector. Alternatively, the shapeable composition can be applied directly to a current collector. The electrode obtained displays a comparatively low porosity which is reduced by compression processes during extrusion or calendering. This has the consequence that the active material is less accessible to the charge carriers. In addition, the otherwise homogeneous distribution of the active material particles and the binder is impaired by the calendering processes at elevated temperatures which are frequently employed. This frequently leads to agglomeration of polymer constituents of the binder on the surface of the electrode, as a result of which the accessibility for the charge carriers decreases further.

SUMMARY OF THE INVENTION

The invention provides a process for producing an electrochemical cell comprising at least one porous electrode, wherein the process comprises at least the following process steps:
(a) provision of an electrode composition in the form of a homogeneous mixture comprising
  (i) at least one particulate active material;
  (ii) at least one particulate binder;
  (iii) at least one particulate pore former; and
  (iv) optionally at least one conductive additive;
(b) formation of a shapeable composition from the electrode composition;
(c) application of the electrode composition to at least one surface of a substrate to give a compact electrode;
(d) production of an electrochemical cell comprising at least one compact electrode which comprises an electrode composition as obtained in process step (a); and
(e) heating of the at least one compact electrode in order to liquefy the at least one particulate pore former; and/or
(f) contacting the compact electrode with at least one liquid electrolyte composition or at least one liquid constituent of an electrolyte composition for an electrochemical cell, which is able to at least partially dissolve the at least one particulate pore former so as to obtain a porous electrode, where the process steps (a), (b), (c), (d) and (e) are carried out largely without solvents.

The electrode composition comprises at least one particulate active material, at least one particulate binder and at least one particulate pore former. In general, the particulate components thus have an average particle diameter of from 1 nm to 1 mm, preferably from 100 nm to 100 μm and in particular from 0.5 μm to 30 μm.

As particulate active material, it is in principle possible to use any material which is suitable as active material for electrochemical cells. Particular preference is given to active materials for negative electrodes and/or positive electrodes for lithium ion batteries. These include, for example as active material for the negative electrode of a lithium ion battery, amorphous silicon which can form alloy compounds with lithium atoms. However, carbon compounds such as graphite are also worthy of mention as active material for negative electrodes. Oxidic active materials for the negative electrode are also known to a person skilled in the art. Mention may be made in particular of $Li_4Ti_5O_{12}$, $TiO_2$, $H_2Ti_{12}O_{25}$ and mixtures thereof. As active material for the positive electrode of a lithium ion battery, it is possible to use, for example, lithiated intercalation compounds which are able to take up and release lithium ions reversibly. The active material of the positive electrode can typically comprise a composed oxide and/or phosphate containing at least one metal selected from the group consisting of cobalt, magnesium, nickel, and also lithium. Preferred examples are, in particular, $LiMn_2O_4$, $LiFePO_4$, $Li_2MnO_3$, $Li_{1.17}Ni_{0.17}Co_{0.1}Mn_{0.56}O_2$, $LiCoO_2$ and $LiNiO_2$. Mention may also be made of compounds of the formula $LiNi_{1-x}M'_xO_2$, where M' is selected from among Co, Mn, Cr and Al and $0 \leq x < 1$. Examples encompass lithium-nickel-cobalt-aluminum oxides (e.g. $LiNi_{0.8}Co_{0.15}Al_{0.05}O_2$; NCA) and lithium-nickel-manganese-cobalt oxides (e.g. $LiNi_{0.8}Mn_{0.1}Co_{0.1}O_2$; NCM (811) or $LiNi_{0.33}Mn_{0.33}Co_{0.33}O_2$; NCM (111)); compounds of the formula $Li_{1+x}Mn_{2-y}M_yO_4$ where $x \leq 0.8$, $y < 2$; $Li_{1+x}Co_{1-y}M_yO_2$ where $x \leq 0.8$, $y < 1$; $Li_{1+x}Ni_{1-y-z}Co_yM_zO_4$ where $x \leq 0.8$, $y<1$, $z<1$ and $y+z<1$, where M can be selected from among Al, Mg and/or Mn; compounds of the formula $n(Li_2MnO_3)$: $n-1(LiNi_{1-x}M'_xO_2)$ where M' is selected from among Co, Mn, Cr and Al and $0<n<1$ and $0<x<1$.

In addition, the electrode composition comprises at least one particulate binder, in particular a polymeric binder. As binder particles, it is possible to use all particulate polymers which can be plasticized on at least part of the surface of the binder particles by heating or by addition of suitable additives, in particular solvents. This makes formation of an adhesive bond, as is necessary for the desired agglomeration of the homogeneous mixture of the particulate components (i) to (iv), on collision with further particulate components possible.

As examples of suitable polymers, mention may be made of thermoplastic polymers, in particular polyolefins (e.g. ethylene- and/or propylene-containing homopolymers and copolymers), polyesters (e.g. polyethylene terephthalate (PET)), polyvinylaromatics (e.g. polystyrene and polystyrene derivatives), polyacrylates (e.g. polymethyl (meth) acrylate). The conventional binders known from the field of electrochemical cells, for example carboxymethyl cellulose (CMC), styrene-butadiene copolymer (SBR), polyvinylidene fluoride (PVDF), polytetrafluoroethene (PTFE) and ethylene-propylene-diene terpolymer (EPDM), may also be emphasized.

Finally, the electrode composition comprises at least one particulate pore former. This is characterized in that it serves as space reserver in the compact electrode during production of the porous electrode. In addition, the particulate pore former is, in particular, a component which can remain in the electrochemical cell and can open possibly closed pores on melting due to its expansion.

A compound or a mixture of compounds which can typically also be used as constituent of an electrolyte composition for an electrochemical cell is preferably chosen as particulate pore former. This is associated with the advantage that the pore former does not have an adverse effect on the properties of the electrochemical cell. In the case of a suitable choice of the constituents, it is preferably also possible for the pore former to be a constituent important for the function of the electrochemical cell.

In one embodiment, the particulate pore former is selected from among at least one lithium salt and/or at least one organic carbonate which is solid at room temperature. Furthermore, it is also possible to use additives which can be added to the electrolyte in order to improve the properties of the latter, provided that these additives are present as solid. Additives which serve to bring about the controlled formation of a solid electrolyte interphase (SEI) may be emphasized. Examples which may be mentioned are sultones, carbonates and polycyclic hydrocarbons.

As preferred lithium salts, mention may be made of those which are typically used as electrolyte salts in electrolyte compositions for electrochemical cells. Suitable lithium salts are preferably selected from the group consisting of lithium halides (LiCl, LiBr, LiI, LiF), lithium chlorate ($LiClO_4$), lithium tetrafluoroborate ($LiBF_4$), lithium hexafluorophosphate ($LiPF_6$), lithium hexafluoroantimonate ($LiSbF_6$), lithium hexafluoroarsenate ($LiAsF_6$), lithium trifluoromethanesulfonate ($LiSO_3CF_3$), lithium bis(fluorosulfonyl)imide ($Li[N(SO_2F)_2]$, LiFSI), lithium bis(trifluoromethylsulfonyl)imide ($Li[N(SO_2(CF_3))_2]$, LiTFSI), lithium bis(pentafluoroethylsulfonyl)imide ($LiN(SO_2C_2F_5)_2$), lithium bis(oxalato)borate ($LiB(C_2O_4)_2$, LiBOB), lithium difluoro(oxalato)borate ($Li[BF_2(C_2O_4)]$, LiDFOB), lithium(difluorotri(pentafluoroethyl))phosphate ($LiPF_2(C_2F_5)_3$) and combinations thereof. Particular preference is given to lithium salts which have a high solubility in aprotic, organic, polar solvents.

As preferred organic carbonates, mention may be made of those which are present in the solid state at room temperature and are typically used as constituent of electrolyte compositions for electrochemical cells. Aprotic, cyclic organic carbonates are worthy of particular emphasis. These are typically used in electrolyte compositions in order to improve the high-temperature stability thereof. In a particularly preferred embodiment of the invention, the particulate pore former comprises at least one aprotic, cyclic organic carbonate. Suitable cyclic carbonates are those having from 3 to 20, preferably from 3 to 10 and in particular from 3 to 5, carbon atoms. Ethylene carbonate and propylene carbonate may be emphasized as examples. Particular preference is given to using ethylene carbonate.

Suitable further additives which can likewise be used as pore formers, optionally in mixtures with the abovementioned compounds, are, in particular, 1,3-propane sultone, vinylene carbonate (1,3-dioxolen-2-one), vinylethylene carbonate (4-vinyl[1,3]-dioxolan-2-one) and fluoroethylene carbonate (4-fluoro-1,3-dioxolan-2-one).

The electrode composition can optionally comprise further constituents. Conductive additives such as graphite and/or conductive carbon black, which increase the electrical conductivity, may be particularly emphasized.

The amounts of the individual components (i) to (iv) always have to be matched to the desired composition and porosity and also the properties of the electrode. The electrode composition usually comprises a proportion of from 1 to 60% by volume, preferably from 10 to 50% by volume and in particular from 15 to 45% by volume of a particulate pore former, based on the total volume of the electrode composition comprising at least the constituents (i), (ii), (iii) and (iv).

The constituents of the electrode composition which are also to be present in the later porous electrode (i.e. the components (i), (ii) and (iv)) are preferably matched to one another in such a way that the proportion of at least one binder (ii) is sufficient to ensure a stable, porous electrode and the proportion of active material (i) is as high as possible. The electrode composition preferably comprises from 80 to 99.9% by weight of active material (i), from 0.1 to 10% by weight of binder (ii) and from 0 to 10% by weight of conductive additive, based on the total amount of active material (i), binder (ii) and conductive additive in the electrode composition. The electrode composition more preferably comprises from 85 to 95% by weight of active material (i), from 2.5 to 7.5% by weight of binder (ii) and from 2.5 to 7.5% by weight of conductive additives (iv), based on the total amount of active material (i), binder (ii) and conductive additives (iv) in the electrode composition.

The electrode composition of the invention is obtained by intimately mixing the constituents (i), (ii), (iii) and (iv) with one another. The electrode composition is preferably provided in the form of a homogeneous, pulverulent composition in process step (a). This is converted in process step (b) into a shapeable composition which is obtained by introduction of kinetic and/or thermal energy. The introduction of energy, in particular of shear forces, forms fibrils from the binder particles and these fibrils bring about agglomeration of the electrode composition. This preferably occurs as a result of the use of mechanical mills such as jet mills or ball mills.

In process step (c), the electrode composition is applied as a layer to the surface of a support material. In one embodiment, the support material is the surface of a tool, e.g. the surface of a moving tape. The latter is preferably made of polymer. The layer can in this case be taken off as freestanding, compact electrode sheet at the end of the production process. In order to avoid or reduce adhesion of the compact electrode to the surface of the support material, the process is preferably carried out at a temperature below the glass transition temperature $T_g$ of the at least one binder. The layer can subsequently be detached as free-standing, compact electrode sheet from the support material and laminated onto a current collector, e.g. at a temperature above the glass transition temperature of the binder.

In a further embodiment, the support material can also be the surface of a current collector. In this case, no freestanding electrode sheet is produced but instead an electrode is obtained straight away.

The compact electrode can subsequently be compacted by means of a press, a punch, a roller or a calender. The compaction step can additionally be carried out under the action of heat in order to assist adhesion of the binder to the surface of the current collector and bring about permanent compaction. However, the temperature is preferably not increased above the melting point of the at least one pore former.

In a preferred embodiment of the invention, the process step (c) comprises a step in which the electrode composition is compacted. The compact electrode obtained displays a high stability and low porosity and can thus be processed readily because of the stability.

The compact electrode obtained in this way is used in a next process step (d) in order to produce an electrochemical cell comprising at least one compact electrode which has been obtained by the process of the invention and comprises the electrode composition provided in process step (a). It is also possible to use a plurality of compact electrodes according to the invention in an electrochemical cell. The electrochemical cell comprises at least one negative electrode (anode), at least one positive electrode (cathode) and at least one separator which is arranged between the at least one negative electrode and the at least one positive electrode and separates the two electrodes from one another.

The process steps (a), (b), (c) and (d) are preferably carried out at a temperature at which the particulate pore former is present as solid. The process temperature during process steps (a), (b), (c) and (d) is usually below 60° C., more preferably below 35° C. and in particular below 20° C.

In a subsequent, optional process step (e), the compact electrode which has already been installed in an electrochemical cell is heated in order to liquefy the at least one particulate pore former. The compact electrode is in this case preferably heated to a temperature above the melting point of the at least one pore former. The heating makes it possible to open up the pores occupied by the pore former. In addition, possibly inaccessible, closed pores are opened by expansion of the pore former at elevated temperatures. The temperature in this process step (e) is preferably above 20° C., more preferably above 35° C. and in particular above 60° C. In a particularly preferred embodiment, the process step (e) is carried out at a temperature which is at least 5° C. above, in particular at least 10° C. above, the melting point of the at least one particulate pore former.

In a further process step (f), the compact electrode is, in addition to or as an alternative to the process step (e), brought into contact with at least one liquid electrolyte composition or at least one liquid constituent of an electrolyte composition for an electrochemical cell. This is able to dissolve the pore formers according to the invention. The liquid composition obtained in this way can remain in the electrochemical cell and in this serves as electrolyte composition.

Without being restricted thereto, typical electrolyte compositions frequently comprise at least one aprotic, organic solvent as liquid constituent. Examples which may be mentioned are aprotic nitriles, aprotic ethers, aprotic esters, aprotic carbonates or a mixture comprising one of the solvents mentioned.

Process steps (e) and (f) can also advantageously be carried out simultaneously. Heating of the compact electrode brings about opening of any closed pores and additionally increases the solubility of the preferably molten pore former in the liquid electrolyte composition. In addition, the time required for filling the electrochemical cell with the electrolyte composition can be significantly reduced in this way.

Process step (f) can also be assisted by the introduction of the liquid electrolyte composition being carried out under reduced pressure. Gas inclusions and increased filling times associated therewith can be avoided in this way.

In a particularly preferred embodiment of the invention, the pore former comprises at least one cyclic carbonate, in particular ethylene carbonate, and the liquid solvent of the electrolyte composition comprises at least one acyclic carbonate, in particular dimethyl carbonate.

Furthermore, the electrolyte composition used preferably comprises all constituents which cannot be introduced in a sufficient amount into the electrolyte composition by the dissolution of the pore formers used. In particular, these are the abovementioned aprotic, organic cyclic carbonates, the electrolyte salts mentioned and the additives mentioned.

The amount of solvent relative to the electrode composition is preferably selected so that the entire amount of pore formers can be dissolved therein without adversely affecting the properties of the electrolyte composition. Rather, the dissolved pore formers have a positive effect on the properties of the electrolyte composition, in particular the stability to high temperatures, the ionic conductivity and/or the formation of the solid electrolyte interphase.

As a result of the dissolution of the at least one pore former present in the (largely nonporous) compact electrode in the electrolyte composition or the liquid constituent thereof, the porous electrode and also the actual electrolyte composition of the electrochemical cell are thus formed in situ.

The invention also provides a porous electrode for an electrochemical cell, obtained by the process of the invention.

The porous electrode of the invention can advantageously be used as electrode in an electrochemical cell which is preferably used in a vehicle, in particular in a vehicle having a conventional internal combustion engine (ICE), in an electric vehicle (EV), in a hybrid vehicle (HEV) or in a plug-in hybrid vehicle (PHEV).

The process of the invention makes it possible to produce electrodes for electrochemical cells without the use of solvents, with the electrodes having a comparatively high porosity which can be varied over a wide range. The omission of solvents enables additional drying steps to be dispensed with. When the electrodes obtained according to the invention are used in an electrochemical cell, the last process step of the process for producing the porous electrode can advantageously be carried out in the finished electrochemical cell. In this way, the time for filling the pores of the electrode with the electrolyte composition can be saved since the pores are formed only in situ with the formation of the electrolyte composition. A plurality of filling steps is usually necessary for this purpose.

BRIEF DESCRIPTION OF THE DRAWINGS

Embodiments of the invention will be described in more detail with the aid of the drawings and the following description.

The drawings show.

DETAILED DESCRIPTION

Figure 1:
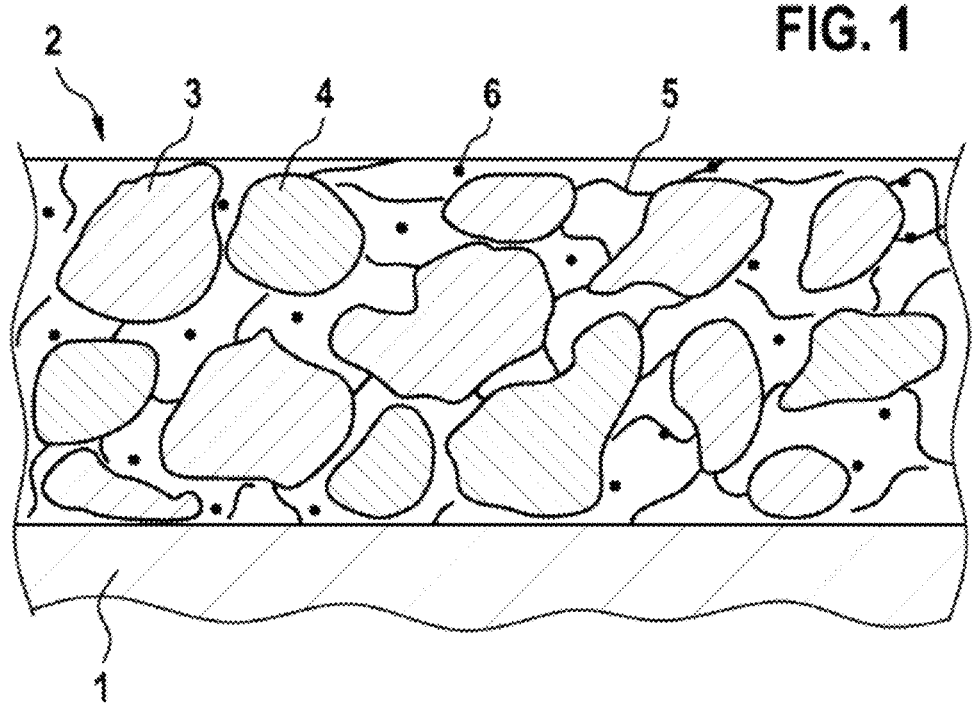
FIG. 1 a schematic section of a compact electrode produced according to the invention before dissolution of the pore formers.

FIG. 1 shows a schematic section of a compact electrode 2 produced according to the invention before dissolution of the pore formers 4. The compact electrode 2 has been applied to a surface of a substrate 1, in the present case a current collector made of aluminum. The compact electrode 2 comprises at least one particulate active material 3 (e.g. an NCM mixed oxide), at least one particulate pore former 4 (e.g. ethylene carbonate) and also particulate conductive additives 6 (e.g. conductive carbon black). The particulate components are joined to one another by fibrils of binder 5 (e.g. composed of PVDF) and thus form a compact composition. The compact electrode 2 was produced by homogeneously mixing particulate active material 3, particulate pore former 4, particulate binder 5 and conductive additive 6. The binder 5 was subsequently fibrillated by introduction of shear energy into the mixture. The fibrils of binder 5 hold the particulate components together and thus form a shapeable composition which was calendered onto the surface of a substrate 1.

Figure 2:
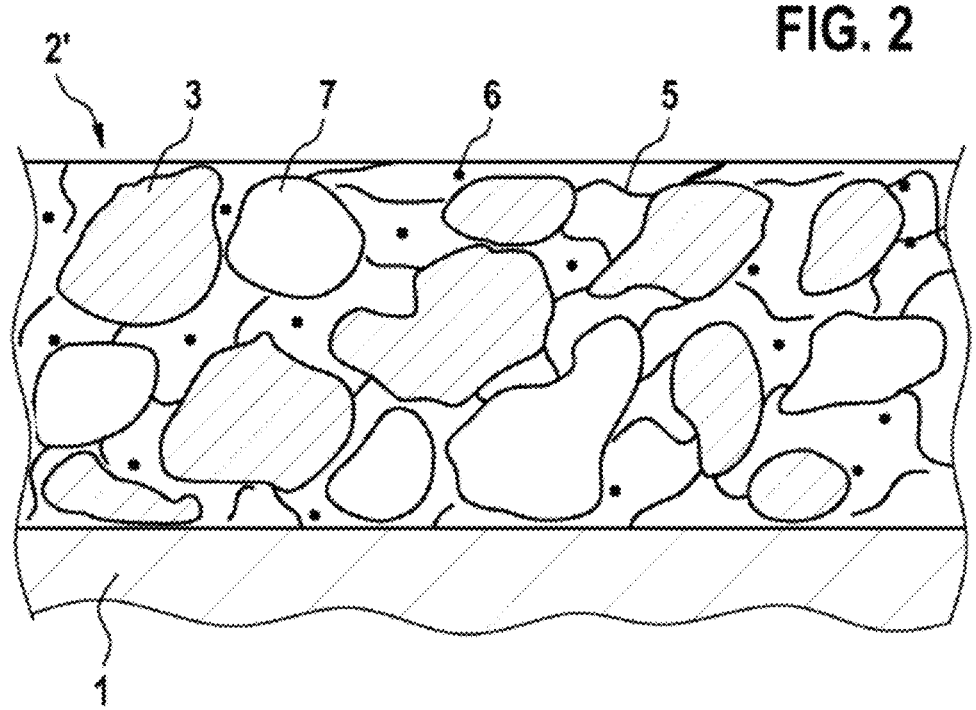
FIG. 2 a schematic section of a porous electrode produced according to the invention after dissolution of the pore formers.

FIG. 2 shows a schematic section of the porous electrode 2' shown in FIG. 1 after the particles of the pore formers 4 have been dissolved. Pores 7 have been formed at the places concerned. Dissolution is effected by firstly bringing the porous electrode 2' to a temperature above the melting point of the pore former 4 and subsequently bringing the electrode into contact with a solvent at this temperature. In the present case, a mixture of dimethyl carbonate and $LiPF_6$ was used as solvent. The resulting composition made up of dimethyl carbonate, ethylene carbonate and $LiPF_6$ can be used directly as electrolyte composition in the electrochemical cell in which the compact electrode 2 is used.

The precise composition of the compact electrode 2 and of the solvent are described in the following example. The comparative example describes a conventional electrode composition.

Comparative Example

A conventional electrode composition usually comprises
90.0 g of active material (NCM mixed oxide)
5.0 g of binder
5.0 g of conductive additive This electrode composition is processed in a jet mill or ball mill at from 20° C. to 100° C., preferably from 50° C. to 70° C., to give a shapeable composition, applied to a current collector and compressed. The electrode obtained is brought into contact under reduced pressure in an electrochemical cell with an electrolyte composition having the following composition:

30.92 g of ethylene carbonate
30.92 g of dimethyl carbonate
7.86 g of $LiPF_6$

The electrode displays a low porosity.

Example

The electrode composition according to the invention comprises, for example:
90.0 g of active material (NCM mixed oxide)
5.0 g of binder
5.0 g of conductive additive
30.92 g of ethylene carbonate This electrode composition is processed in a jet mill at from 20° C. to 50° C. to give a shapeable composition, applied to a current collector and compressed. The compact electrode 2' obtained in this way is brought into contact under reduced pressure in an electrochemical cell with an electrolyte composition having the following composition:
30.92 g of dimethyl carbonate
7.86 g of $LiPF_6$ In contact with the electrode composition under reduced pressure and at 50° C., the ethylene carbonate is dissolved out of the compact electrode 2. The properties of the electrolyte composition are improved in respect of the thermal stability by the addition of ethylene carbonate. Compared to the conventional electrode of the comparative example, the porous electrode 2' displays a high porosity.

The invention is not restricted to the working examples described here and the aspects emphasized therein. Rather, many modifications of the type which a person skilled in the art would normally make are possible within the scope indicated by the claims.

What is claimed is:

1. A process for producing an electrochemical cell comprising at least one porous electrode (2'), wherein the process comprises at least the following process steps:
    (a) provision of an electrode composition in the form of a homogeneous mixture comprising
        (i) at least one particulate active material (3);
        (ii) at least one particulate binder (5);
        (iii) at least one particulate pore former (4); and
        (iv) optionally at least one conductive additive (6);
    (b) formation of a shapeable composition from the electrode composition;
    (c) application of the electrode composition to at least one surface of a substrate (1) to give a compact electrode (2);
    (d) production of an electrochemical cell comprising at least one compact electrode (2) which comprises the electrode composition as obtained in process step (a); and
    (e) heating of the at least one compact electrode (2) in order to liquefy the at least one particulate pore former (4); and
    (f) contacting the compact electrode (2) with at least one liquid electrolyte composition or at least one liquid constituent of an electrolyte composition for an electrochemical cell, which is able to at least partially dissolve the at least one particulate pore former (4) so as to obtain a porous electrode (2'),
    where the process steps (a), (b), (c), (d) and (e) are carried out without solvents.

2. The process as claimed in claim 1, wherein the electrode composition is provided in process step (b) in the form of a shapeable composition which is obtained by introduction of kinetic and/or thermal energy.

3. The process as claimed in claim 1, wherein the process step (c) comprises a step in which the electrode composition is compressed.

4. The process as claimed in claim 1, wherein the process steps (a), (b), (c) and (d) are carried out at a temperature at which the particulate pore former (4) is present as solid.

5. The process as claimed in claim 1, wherein the particulate pore former (4) is a constituent of an electrolyte composition for an electrochemical cell.

6. The process as claimed in claim 1, wherein the liquid constituent of an electrolyte composition is a constituent which is liquid at room temperature of an electrolyte composition for an electrochemical cell.

7. The process as claimed in claim 1, wherein the particulate pore former (4) is selected from among at least one lithium salt, at least one organic carbonate which is solid at room temperature and/or at least one additive which can be used for improving the properties of the electrolyte.

8. The process as claimed in claim 1, wherein the process steps (e) and (f) are carried out simultaneously.

9. A process for producing an electrochemical cell comprising at least one porous electrode (2'), wherein the process comprises at least the following process steps:
(a) provision of an electrode composition in the form of a homogeneous mixture comprising
  (i) at least one particulate active material (3);
  (ii) at least one particulate binder (5);
  (iii) at least one particulate pore former (4); and
  (iv) optionally at least one conductive additive (6);
(b) formation of a shapeable composition from the electrode composition;
(c) application of the electrode composition to at least one surface of a substrate (1) to give a compact electrode (2);
(d) production of an electrochemical cell comprising at least one compact electrode (2) which comprises the electrode composition as obtained in process step (a); and
(e) heating of the at least one compact electrode (2) in order to liquefy the at least one particulate pore former (4);
where the process steps (a), (b), (c), (d) and (e) are carried out without solvents.

10. The process as claimed in claim 9, wherein the formation of the shapeable composition is obtained by introduction of kinetic and/or thermal energy.

11. The process as claimed in claim 9, wherein the process step (c) comprises a step in which the electrode composition is compressed.

12. The process as claimed in claim 9, wherein the process steps (a), (b), (c) and (d) are carried out at a temperature at which the particulate pore former (4) is present as solid.

13. The process as claimed in claim 9, wherein the particulate pore former (4) is a constituent of an electrolyte composition for an electrochemical cell.

14. The process as claimed in claim 9, wherein the particulate pore former (4) is selected from among at least one lithium salt, at least one organic carbonate which is solid at room temperature and/or at least one additive which can be used for improving the properties of an electrolyte.

* * * * *